(12) United States Patent
Chaudhuri et al.

(10) Patent No.: US 6,223,171 B1
(45) Date of Patent: Apr. 24, 2001

(54) WHAT-IF INDEX ANALYSIS UTILITY FOR DATABASE SYSTEMS

(75) Inventors: Surajit Chaudhuri, Redmond; Vivek Narasayya, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/139,843

(22) Filed: Aug. 25, 1998

(51) Int. Cl.[7] .................................................. G06F 17/30

(52) U.S. Cl. ........................................... 707/2; 707/1

(58) Field of Search .................................. 707/1, 2, 100, 707/104, 200

(56) References Cited

U.S. PATENT DOCUMENTS

| | | | |
|---|---|---|---|
| 5,404,510 | * 4/1995 | Smith et al. | 707/2 |
| 5,544,355 | 8/1996 | Chaudhuri et al. | 707/2 |
| 5,598,559 | 1/1997 | Chaudhuri | 707/2 |
| 5,644,763 | 7/1997 | Roy | 707/101 |
| 5,778,353 | * 7/1998 | Schieffer et al. | 707/2 |
| 5,806,057 | 9/1998 | Gormley et al. | 707/1 |
| 5,822,749 | 10/1998 | Agarwal | 707/2 |
| 5,845,274 | * 12/1998 | Chadha et al. | 707/2 |
| 5,924,088 | * 7/1999 | Jakobsson et al. | 707/2 |

OTHER PUBLICATIONS

Caprara, Alberto, et al., "Exact and Approximate Algorithms for the Index Selection Problem in Physical Database Design," *IEEE Transactions on Knowledge and Data Engineering*, vol. 7, No. 6, pp. 955–967 (Dec. 1995).

Chaudhuri, Surajit, et al., "An Efficient, Cost–Driven Index Selection Tool for Microsoft SQL Server," *Proceedings of the 23rd International Conference on Very Large Data Bases (VLDB)*, Athens, Greece, pp. 146–155 (Aug. 25–29, 1997).

Chaudhuri, Surajit, et al., "AutoAdmin 'What–if' Index Analysis Utility," *Proceedings of ACM SIGMOD*, Seattle, Washington, pp. 367–378 (Jun. 1–4, 1998).

Chaudhuri, Surajit, et al., "Random Sampling for Histogram Construction: How Much is Enough?" *Proceedings of ACM SIGMOD*, Seattle, Washington, pp. 436–447 (Jun. 1–4, 1998).

Choenni, Sunil, et al., "A Framework for a Tool for Physical Database Design," *Proceedings of Computing Science in the Netherlands*, pp. 96–107 (1992).

Choenni, Sunil, et al., "On the Automation of Physical Database Design," *Proceedings of the ACM Symposium on Applied Computing (SAC)*, pp. 358–367 (Feb. 1993).

Choenni, Sunil, et al., "Index Selection in Relational Databases," *Proceedings of the Fifth International Conference on Computing and Information (ICCI)*, IEEE Computer Society, Sudbury, Ontario, Canada, pp. 491–496 (May 27–29, 1993).

(List continued on next page.)

*Primary Examiner*—Paul V. Kulik
(74) *Attorney, Agent, or Firm*—Watts, Hoffmann, Fisher & Heinke, Co., L.P.A.

(57) ABSTRACT

What-if index analysis utility provides the ability to analyze the performance of the existing configuration of a database system with respect to one or more workloads of queries and to propose a hypothetical configuration for the database system to analyze its potential impact on the performance of the database system. The utility may be used, for example, to perform an impact analysis of the set of indexes selected by an index selection tool, for example, with respect to a workload of queries and may also be used to explore what-if scenarios for the database system by analyzing the impact of hypothetical sets of indexes with respect to the execution of various workloads over projected sizes of a database. The utility may be used to perform summarizations of workloads, configurations, and the performance of workloads with respect to the existing configuration and hypothetical configurations. What-if index analysis utility may be used, for example, by a database administrator or a physical database design tool to help improve performance of a database system.

62 Claims, 7 Drawing Sheets

OTHER PUBLICATIONS

Choenni, Sunil, et al., "On the Selection of Secondary Indices in Relational Databases," *Data & Knowledge Engineering*, 11, pp. 207–233 (1993).

Corrigan, Peter, et al., *ORACLE Performance Tuning*, O'Reilly & Associates, Inc., pp. 81–86 (1993).

Finkelstein, S., et al., "Physical Database Design for Relational Databases," *ACM Transactions on Database Systems (TODS)*, vol. 13, No. 1, pp. 91–128 (Mar. 1988).

Frank, Martin R., et al., "Adaptive and Automated Index Selection in RDBMS," *Advances in Database Technology, Proceedings of the Third International Conference on Extending Database Technology (EDBT)*, Vienna, Austria, pp. 277–292 (Mar. 23–27, 1992).

Gupta, Himanshu, et al., "Index Selection for OLAP," *Proceedings of ICDE*, 20 pages (Apr. 7–11, 1997).

Hammer, Michael, et al., "Index Selection in a Self–Adaptive Data Base Management System," *Proceedings of the ACM SIGMOD Conference*, Washington, D.C., pp. 93–101 (Jun. 1976).

Harinarayan, Venky, et al., "Implementing Data Cubes Efficiently," *Proceedings of the ACM SIGMOD Conference*, pp. 205–216 (1996).

Hobbs, Lilian, et al., *Rdb/VMS: A Comprehensive Guide*, Digital Press, pp. vii–x and 289–298 (1991).

Labio, Wilburt Juan, et al., "Physical Database Design for Data Warehouses," *Proceedings of ICDE*, 30 pages (Apr. 7–11, 1997).

Olken, Frank, et al., "Simple Random Sampling from Relational Databases," *Proceedings of the Twelfth International Conference on Very Large Data Bases (VLDB)*, Kyoto, pp. 160–169 (Aug. 1986).

Olken, Frank, "Random Sampling from Databases," PhD Dissertation, University of California at Berkeley, Abstract, pp. iii–vi (1993).

Olken, Frank, et al., "Random Sampling from Databases—A Survey," Information and Computing Sciences Div., Lawrence Berkeley Laboratory, Berkeley, California, pp. 1–55 (Mar. 1994).

Ross, Kenneth A., et al., "Materialized View Maintenance and Integrity Constraint Checking: Trading Space for Time," *Proceedings of the ACM SIGMOD Conference*, pp. 447–458 (Apr. 1996).

Rozen, Steve, et al., "A Framework for Automating Physical Database Design," *Proceedings of the Seventeenth International Conference on Very Large Data Bases (VLDB)*, Barcelona, Spain, pp. 401–411 (Sep. 1991).

Stonebraker, Michael, "Hypothetical Data Bases as Views," *Proceedings of the ACM SIGMOD Conference*, pp. 224–229 (1981).

* cited by examiner

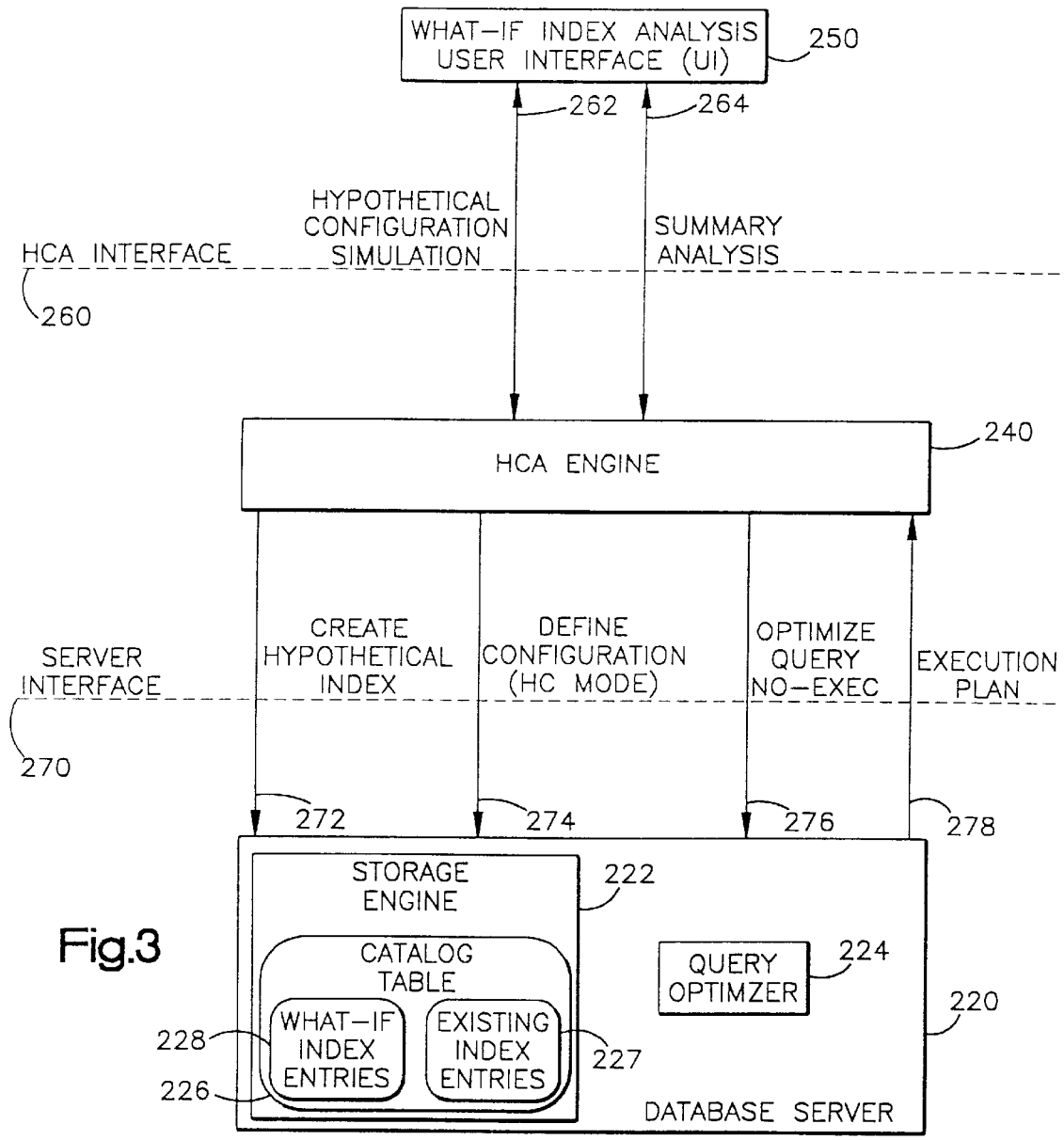

WHAT-IF INDEX ANALYSIS UTILITY FOR DATABASE SYSTEMS

TECHNICAL FIELD

The present invention relates generally to the field of database systems. More particularly, the present invention relates to the field of indexing data for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use indexes to help access data in a database more efficiently. Although all possible indexes for a database can be constructed, the number of possible indexes over a database can be very large and can significantly increase the memory requirements, including storage requirements, for the database. Also, many of the possible indexes may provide no or minimal performance advantage considering the data in the database, the organization of the data in the database, and the usage of the database as represented by a workload of queries executed against the database. Typical database systems therefore use only a subset of possible indexes for accessing databases.

A physical database design tool or database administrator typically selects a set of indexes for use by a database system from among possible combinations of indexes for a database. The effectiveness of any set of indexes depends, for example, on the data in the database, on the query optimizer accessing the database, and on the workload of queries to be executed against the database. As a database system evolves through database updates and modifications and through changes in workloads of queries, for example, new sets of indexes should be considered and selected to help maintain a desired level of performance of the database system.

Because the space of possible indexes over a database can be very large, however, searching among such indexes can incur substantial cost in time and memory. The problem of selecting a set of indexes can be further compounded by the presence of multi-column indexes and by the innovative ways some query processors use indexes, such as index intersection and indexed-only access for example. Although a physical database design tool may be used to automate the selection of a set of indexes in light of these concerns, the search algorithm of the design tool may not address specific concerns of the database administrator such as, for example: (1) Which queries executed in the last three days will slow down because of projected changes in the database? or (2) Which queries will benefit from the index(es) that the design tool is proposing to add and to what extent?

SUMMARY OF THE INVENTION

What-if index analysis utility may be used to perform quantitative analyses of a database system. What-if index analysis utility may be used, for example, to analyze the performance of the existing configuration of the database system with respect to one or more workloads of queries and to propose a hypothetical configuration for the database system to analyze its potential impact on the performance of the database system. Exemplary impact analyses comprise the analysis of workloads over a database system, the analysis of an existing set of indexes and proposed or hypothetical sets of indexes, estimating changes in cost to execute a workload with respect to a hypothetical configuration, and studying index usage by a workload for projected changes in the size of a database. What-if index analysis utility may be used, for example, by a database administrator or a physical database design tool to help improve performance of a database system.

In accordance with the present invention, a method may be used for analyzing a database system that executes queries over an existing configuration defined by an existing database and an existing set of indexes. The method may be implemented in the form of program modules or computer-executable instructions stored on a computer readable medium.

For the method, a hypothetical configuration is defined for the database system. A hypothetical set of indexes and/or a hypothetical database size may be defined for the hypothetical configuration. A scaling factor or a row count for one or more tables of the existing database may be defined for the hypothetical database size.

Design analysis data of the database system with respect to the hypothetical configuration is generated. In generating design analysis data, one or more hypothetical indexes for the hypothetical index set may be created by sampling data of the existing database and generating statistical information for each hypothetical index based on the data sampling. Also, the hypothetical configuration for the database system may be simulated. A cost of one or more queries with respect to the existing configuration and/or with respect to the hypothetical configuration may be estimated using a query optimizer of a database server. This cost may be estimated as the cost of the one or more queries with respect to the hypothetical configuration relative to the cost of the one or more queries with respect to the existing configuration. Index usage of one or more queries with respect to the existing configuration or with respect to the hypothetical configuration may be identified using the query optimizer.

One or more features of the database system may be summarized based on the generated design analysis data. A feature of a workload of one or more queries may be summarized. The workload feature may be summarized based on a measure of one or more properties of each query of the workload. A feature of the existing configuration or the hypothetical configuration may be summarized. The configuration feature may be summarized based on a measure of one or more properties of the configuration. A feature of an estimated performance of one or more queries with respect to the existing configuration or with respect to the hypothetical configuration may be summarized. The estimated performance feature may be summarized based on a measure of one or more properties of the estimated performance. The one or more properties of the estimated performance may comprise a cost to execute a query with respect to a configuration and/or one or more indexes expected to be used in executing a query with respect to a configuration.

Another method may be used for interfacing for a database system that executes queries over an existing configuration defined by an existing database and an existing set of indexes. The method may be implemented in the form of program modules or computer-executable instructions stored on a computer readable medium.

For this method, one or more commands are issued to define a hypothetical configuration for the database system and generate design analysis data of the database system with respect to the hypothetical configuration. Commands may be issued to define a hypothetical set of indexes for the hypothetical configuration, to define a hypothetical database size for the hypothetical configuration, to estimate a cost of one or more queries with respect to the existing configuration or with respect to the hypothetical configuration, or to estimate index usage of one or more queries with respect to the existing configuration or with respect to the hypothetical configuration.

Another method may be used for interfacing for a database system. The method may be implemented in the form of program modules or computer-executable instructions stored on a computer readable medium.

For this method, one or more commands designating an analysis class and a set of one or more objects may be issued to obtain summary analysis data about the set of one or more objects based on design analysis data of the database system and in accordance with the analysis class. The analysis class may be a workload analysis and each object of the set of one or more objects may be a query. The analysis class may be a configuration analysis and the set of one or more objects may comprise indexes of an existing or hypothetical configuration for the database system. The analysis class may be a cost and index usage analysis and the set of one or more objects may comprise a relationship object for a workload and a configuration for the database system.

A command designating a summarization measure with respect to a property of the set of one or more objects for the summary analysis data may be issued. The summarization measure may be a count, sum, minimum, maximum, or average value of a property measure of the set of one or more objects. A command designating a rank with respect to a property measure of the set of one or more objects for the summary analysis data may be issued. A command designating a filter condition for the set of one or more objects may be issued to obtain summary analysis data about a subset of the set of one or more objects in accordance with the analysis class. A command designating a partitioning criteria for the set of one or more objects may be issued to obtain summary analysis data for each of a plurality of partitions of the set of one or more objects in accordance with the analysis class.

BRIEF DESCRIPTION OF THE DRAWINGS

The present invention is illustrated by way of example and not limitation in the figures of the accompanying drawings, in which like references indicate similar elements and in which:

FIG. 3 illustrates, for one embodiment, a hypothetical configuration analysis (HCA) engine and a database server for the database system of FIG. 2;

DETAILED DESCRIPTION OF THE INVENTION

The subject matter of this patent application is disclosed in a conference paper, Surajit Chaudhuri and Vivek Narasayya, "AutoAdmin 'What-If' Index Analysis Utility," *Proceedings of ACM SIGMOD*, Seattle, Wash., pp. 367–378 (Jun. 1–4, 1998). This paper is herein incorporated by reference.

What-if index analysis utility in accordance with the present invention may be used to perform quantitative analyses of a database system. What-if index analysis utility may be used, for example, to analyze the performance of the existing configuration of the database system with respect to one or more workloads of queries and to propose a hypothetical configuration for the database system to analyze its potential impact on the performance of the database system. Exemplary impact analyses comprise the analysis of workloads over a database system, the analysis of an existing set of indexes and proposed or hypothetical sets of indexes, estimating changes in cost to execute a workload with respect to a hypothetical configuration, and studying index usage by a workload for projected changes in the size of a database. What-if index analysis utility may be used, for example, by a database administrator or a physical database design tool to help improve performance of a database system.

Exemplary Operating Environment

Figure 1:
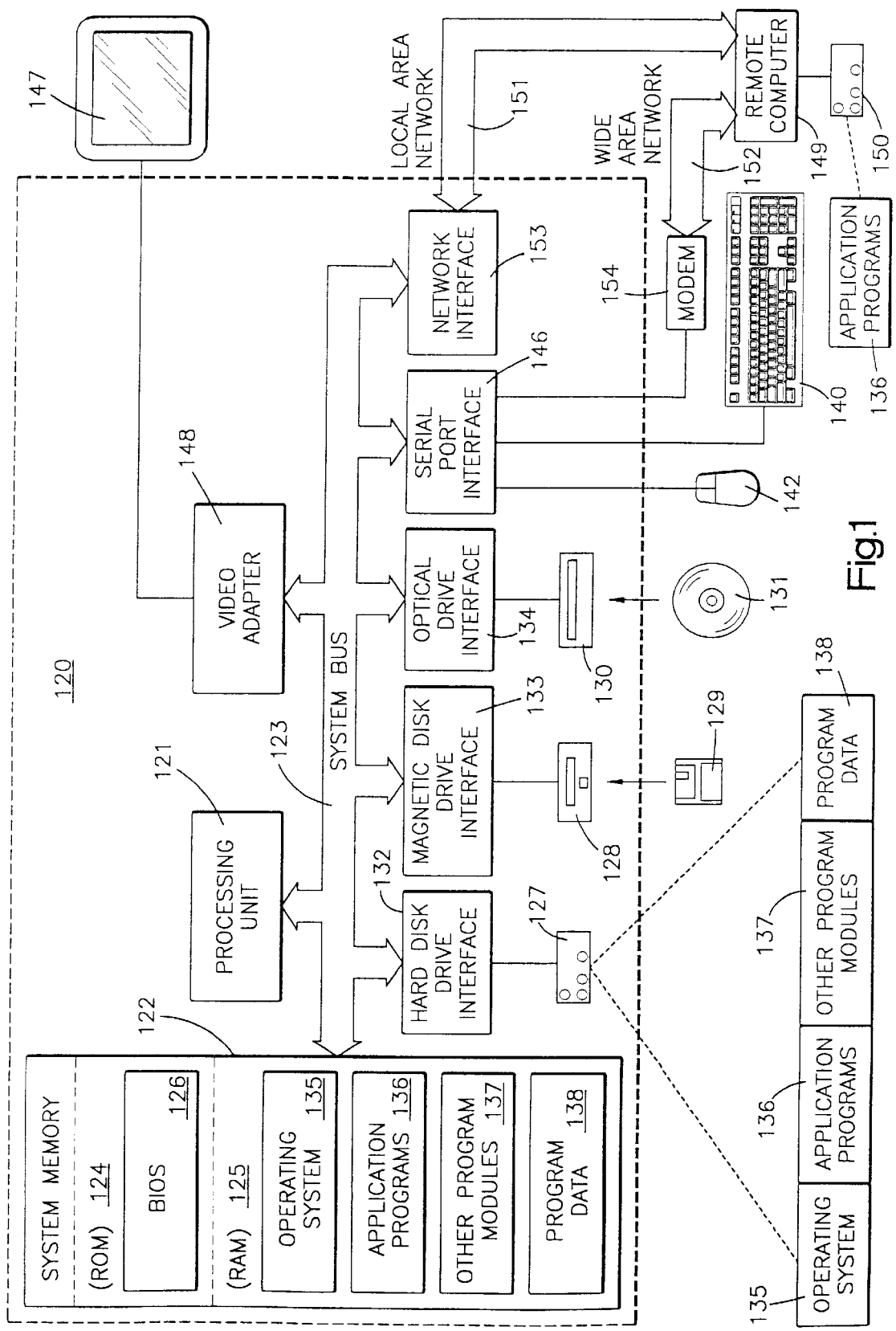
FIG. 1 illustrates an exemplary operating environment for performing what-if index analysis of a database system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
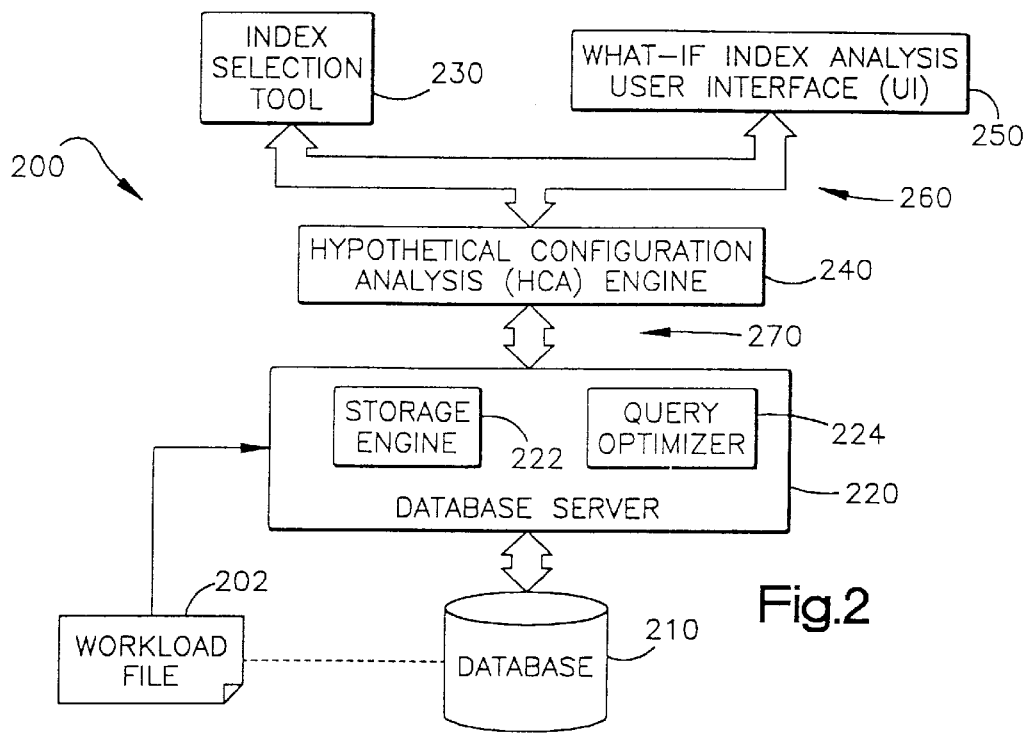
FIG. 2 illustrates, for one embodiment, a database system for performing what-if index analysis.

FIG. 2 illustrates for one embodiment a computer database system 200 comprising a database 210, a database server 220, an index selection tool 230, a hypothetical configuration analysis (HCA) engine 240, and a what-if index analysis user interface (UI) 250. Database system 200 manages the storage and retrieval of data in database 210 in accordance with data manipulation statements or queries presented to database system 200 by a database application or by a user, for example.

Database 210 comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update. Database server 220 for one embodiment comprises the Microsoft® SQL Server.

Database server 220 comprises a storage engine 222 for accessing data in database 210. To enhance performance in processing queries, database server 220 also comprises a query optimizer 224 that uses indexes of a selected set of indexes to help access data in database 210 more efficiently. An index may be single-column or multi-column and may be clustered or non-clustered. The possible indexes that may be included in the selected set of indexes depends, for example, on the data of database 210.

Index selection tool 230 automatically selects a set of indexes for use by database server 220. Index selection tool 230 for one embodiment attempts to select an effective set of indexes to help minimize the cost of executing queries of a workload as designated by a workload file 202, for example, against database 210. The effectiveness of a given set of indexes for one embodiment is based on cost estimates as determined by query optimizer 224 to execute queries of workload file 202 against database 210 using the set of indexes.

Workload file 202 designates a set of queries to be executed against database 210. Workload file 202 for one embodiment may be created manually. Workload file 202 may also be generated automatically by logging activity on database server 220 over a specified period of time. For embodiments using the Microsoft® SQL Server for database server 220, the SQL Server Profiler may be used to generate workload file 202 in this manner. Workload file 202 may be stored in and loaded from database server 220.

Index selection tool 230 for one embodiment is described in U.S. patent application Ser. No. 08/912,036, filed Aug. 15, 1997, entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; in U.S. patent application Ser. No. 08/980,830, filed Dec. 1, 1997, entitled DATABASE SYSTEM INDEX SELECTION USING CANDIDATE INDEX SELECTION FOR A WORKLOAD, by Surajit Chaudhuri and Vivek Narasayya; in U.S. patent application Ser. No. 08/982,046, filed Dec. 1, 1997, entitled DATABASE SYSTEM INDEX SELECTION USING INDEX CONFIGURATION ENUMERATION FOR A WORKLOAD, by Surajit Chaudhuri and Vivek Narasayya; in U.S. patent application Ser. No. 08/980,831, filed Dec. 1, 1997, entitled DATABASE SYSTEM MULTI-COLUMN INDEX SELECTION FOR A WORKLOAD, by Surajit Chaudhuri and Vivek Narasayya; in U.S. patent application Ser. No. 08/980,829, filed Dec. 1, 1997, entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; and in the conference paper, Surajit Chaudhuri and Vivek Narasayya, "An Efficient, Cost-Driven Index Selection Tool for Microsoft® SQL Server," *Proceedings of the 23rd International Conference on Very Large DataBases (VLDB)*, Athens, Greece, pp. 146–155 (Aug. 25–29, 1997). These patent applications and this conference paper are each herein incorporated by reference.

Although index selection tool 230 may select a relatively effective set of indexes given workload file 202 and the data of database 210, a database administrator may have specific concerns which may not have been addressed by index selection tool 230 such as, for example: (1) Which queries executed in the last three days will slow down because of projected changes in the database? or (2) Which queries will benefit from the index(es) that the index selection tool is proposing to add and to what extent?

Hypothetical configuration analysis (HCA) engine 240 may be used to perform quantitative analyses of database system 200. HCA engine 240 may be used, for example, to define and analyze a workload of queries, to define and analyze a hypothetical set of indexes, and to analyze the impact of a workload of queries, a hypothetical set of indexes, or projected changes in size of database 210 on the performance of database system 200. HCA engine 240 may therefore be used to perform an impact analysis of the set of indexes selected by index selection tool 230 with respect to a workload of queries. HCA engine 240 may also be used to explore what-if scenarios for database system 200 by analyzing the impact of hypothetical sets of indexes with respect to the execution of various workloads over projected sizes of database 210.

A database administrator, index selection tool 230, and any other suitable client tool may therefore use HCA engine 240 to analyze database system 200 and to improve performance of database system 200, for example, by modifying the set of indexes selected for use by database server 220 in accessing database 210. HCA engine 240 may be used as a back-end for index selection tool 230, for example, to enumerate and select a set of indexes by allowing index selection tool 230 to determine the effectiveness of a given set of indexes.

A database administrator may interface with HCA engine 240 using what-if index analysis UI 250. What-if index analysis UI 250, index selection tool 230, and other suitable client tools may interface with HCA engine 240 using an HCA interface 260. HCA engine 240 interfaces with database server 220 using a server interface 270.

HCA engine 240 may be implemented as a library, such as a dynamic linked library (DLL) for example, that can be linked to client tools or as a middle-ware process that serves multiple client tools. HCA engine 240 may also be built as an add-on to database server 220 and may implement HCA interface 260 by extending the interface to database server 220.

Database server 220, storage engine 222, query optimizer 224, index selection tool 230, HCA engine 240, and what-if index analysis UI 250 for one embodiment are implemented as program modules or computer-executable instructions and may be stored on any suitable computer-readable medium for execution in a suitable operating environment, such as the computing environment of FIG. 1 for example. The data of database 210 and workload file 202 may be implemented in the form of one or more suitable data structures and may also be stored on any suitable computer-readable medium.

Hypothetical Configurations

HCA engine 240 may be used to analyze the existing configuration and one or more hypothetical configurations for database system 200. A configuration comprises a set of indexes and a database size. The existing configuration comprises the current or existing set of indexes selected for use by database server 220 in accessing database 210 and the current or existing size of database 210.

HCA engine 240 may be used to define a hypothetical configuration by projecting changes to the existing configuration of database system 200. HCA engine 240 may then be used for analysis of the potential impact of the projected changes on the performance of database system 200. HCA engine 240 may also be used to define and analyze a hypothetical configuration independent of the existing configuration. HCA engine 240 for one embodiment analyzes the impact of a hypothetical configuration on the performance of database system 200 by simulating the hypothetical configuration using database server 220.

HCA engine 240 may be used to define a hypothetical set of indexes for a hypothetical configuration. A hypothetical set of indexes may comprise existing indexes created by database server 220 and/or hypothetical indexes. Hypothetical indexes are also known as what-if indexes. HCA engine 240 may be used to define a hypothetical set of indexes by projecting changes to a set of indexes for an existing configuration, for example, by adding indexes to and/or deleting indexes from the existing set of indexes. HCA engine 240 may then be used for analysis of the impact of the projected changes on the performance of database system 200. HCA engine 240 may also be used to define and analyze a hypothetical set of indexes independent of the existing set of indexes.

The set of indexes for an existing or hypothetical configuration should be consistent with the constraints defined by the schema of database 210. As one example, the set of indexes for a configuration should comprise an index on column C if a table of database 210 has a uniqueness constraint on table C. As another example, the set of indexes for a configuration may comprise at most one clustering index for the same table.

HCA engine 240 may also be used to define a hypothetical database size for a hypothetical configuration. HCA engine 240 for one embodiment may be used to define a hypothetical database size by projecting changes to database 210. HCA engine 240 may then be used for analysis of the impact of the projected changes on the performance of database system 200.

A hypothetical database size for one embodiment comprises a database scaling value which is a set of scaling multipliers $m_j$ each respectively associated with a table $T_j$ of database 210. The resulting hypothetical configuration represents a hypothetical database with each table $T_j$ of the hypothetical database having $m_j$ times the number of rows as the table $T_j$ of the existing database 210. The database scaling value may therefore be used to represent not only a hypothetical database that is larger or smaller than the existing database 210 but also a hypothetical database where the relative sizes of the tables are different from those for the existing database 210. The hypothetical database size for another embodiment comprises a hypothetical row count for each table $T_j$ of database 210.

HCA engine 240 may be used to analyze the existing configuration and a hypothetical configuration with respect to a workload of queries. HCA engine 240 may be used, for example, to estimate the cost of a workload with respect to a hypothetical configuration. HCA engine 240 for one embodiment may represent this cost relative to the cost estimate of the workload with respect to the existing configuration. HCA engine 240 may also be used to analyze the usage of indexes by queries of a workload with respect to a hypothetical configuration.

Hypothetical Configuration Analysis (HCA) Interface

As illustrated in FIG. 3, HCA interface 260 comprises a hypothetical configuration simulation interface 262 to support the ability to simulate hypothetical configurations with one or more commands for execution by HCA engine 240. Hypothetical configuration simulation interface 262 supports one or more commands to define workloads, to define hypothetical configurations, and to evaluate workloads for existing and hypothetical configurations.

Hypothetical configuration simulation interface 262 for one embodiment supports the following commands.

Define Workload <workload_name> [From <file> | As $(Q_1, f_1), (Q_2, f_2), \ldots, (Q_n, f_n)$]

Define Configuration <configuration_name> As (Table$_1$, column_list$_1$), . . . , (Table$_i$, column_list$_i$)

Set Database Size Of <configuration_name> As (Table$_1$, row_count$_1$), . . . , (Table $_i$, row_count$_i$)

Estimate Configuration Of <workload_name> For <configuration_name>

Remove [Workload <workload_name> | Configuration <configuration_name> | Cost-Usage <workload_name>, <configuration_name>]

Although described in the context of particular commands each having a particular syntax, hypothetical configuration simulation interface 262 may use any suitable set of one or more commands to support the ability to simulate hypothetical configurations using HCA engine 240.

In executing the Define Workload command, HCA engine 240 associates a name as designated by <workload_name> with a set of queries. The set of queries may be specified from a file, such as workload file 202 for example, as designated by <file> or directly through the command as designated by $(Q_1, f_1), (Q_2, f_2), \ldots, (Q_n, f_n)$. A frequency value $f_i$ is associated with each query $Q_i$ to indicate the number of copies of the query $Q_i$ the defined workload is to comprise. HCA engine 240 may also associate a set of properties with each query $Q_i$, such as, for example, the text of the query $Q_i$, the set of tables referenced in the query $Q_i$, and the columns in the query $Q_i$ with conditions on them. HCA engine 240 for one embodiment may obtain such properties using extended server interfaces that expose parsed query information.

HCA engine 240 for one embodiment generates analysis data for the defined workload in accordance with the following Table 1.

TABLE 1

Workload Analysis Data

| Workload Name | Query ID | Frequency | Query Properties |
|---|---|---|---|
| Workload_A | 1 | 1 | <Query Text>, $(T_1, T_2)$, etc. |

In executing the Define Configuration command, HCA engine 240 registers a new configuration associated with a name as designated by <configuration_name> and comprising a set of indexes as designated by (Table$_1$, column_list$_1$), . . . , (Table$_i$, column_list$_i$). HCA engine 240 for one embodiment may initially set the database size for a newly registered hypothetical configuration to that of the existing configuration.

HCA engine 240 for one embodiment generates analysis data for the defined configuration in accordance with the following Table 2.

TABLE 2

Configuration Analysis Data

| Configuration Name | Indexes in Configuration | Scaling Values |
|---|---|---|
| Current_Configuration | Index_A, Index_B, Index_D | $(T_1, 1)$, $(T_2, 5)$ |

The set of indexes designated for the new configuration may comprise existing indexes created by database server 220 and/or hypothetical indexes. Existing indexes for one embodiment may alternatively be designated in the Define Configuration command by name. HCA engine 240 may obtain information associated with each index by reference to catalog table 226. Database server 220 for one embodiment generates such information in accordance with the following Table 3.

TABLE 3

Index Information

| Index Name | Table Name | Number of Rows | Number of Pages | Columns | Index Statistics |
|---|---|---|---|---|---|
| Index_A | R | 100,000 | 1865 | R.a | <histogram> |

Once a configuration is registered, the Set Database Size command may be used to define a hypothetical database size for the configuration. In executing the Set Database Size command, HCA engine 240 sets the number of rows of each table of database 210 as designated by (Table$_1$, row_count$_1$), . . . , (Table$_i$, row_count$_i$) for the configuration designated by <configuration_name>.

In executing the Estimate Configuration command, HCA engine 240 estimates the cost to execute each query of the workload designated by <workload_name> with respect to the configuration designated by <configuration_name>. HCA engine 240 may also determine the usage of indexes by each query of the workload <workload_name> with respect to the configuration <configuration_name>. HCA engine 240 for one embodiment generates such analysis data in the form of a relation in accordance with the following Table 4.

TABLE 4

Cost and Index Usage Analysis Data

| Configuration Name | Query ID | Cost | Indexes Used |
|---|---|---|---|
| New_Configuration | 1 | 0.02 | Index_A, Index_D |
| New_Configuration | 2 | 0.11 | Index_B |

Conceptually, the relation has as many rows as queries in the workload <workload_name> for each configuration that is evaluated. Configuration Name identifies the configuration <configuration_name>, Query ID identifies each query of the workload <workload_name>, Cost identifies a cost estimate to execute each query of the workload <workload_name> with respect to the configuration <configuration_name> relative to the total cost estimate of the workload <workload_name> with respect to the existing configuration, and Indexes Used identifies those indexes of the set of indexes for the configuration <configuration_name> that are expected to be used by database server 220 to execute each query of the workload <workload_name> with respect to the configuration <configuration_name>.

In executing the Remove command, HCA engine 240 removes analysis data generated in executing other commands. In executing the Remove Workload command or the Remove Configuration command, HCA engine 240 removes all analysis data, including any cost and index usage analysis data, about the designated workload <workload_name> or the designated configuration <configuration_name>, respectively. In executing the Remove Cost-Usage command, HCA engine 240 for one embodiment removes only the cost and index usage information for the designated workload <workload_name> and the designated configuration <configuration_name> and retains the workload analysis data about the workload <workload_name> and the configuration analysis data about the configuration <configuration_name>. HCA engine 240 may execute the Remove command by deleting from the analysis data tables rows corresponding to the workload and/or configuration designated by the command.

For other embodiments, hypothetical configuration simulation interface 262 may alternatively interface directly with database server 220 using suitable server extensions to simulate hypothetical configurations.

What-if index analysis UI 250 provides a user interface for a database administrator to simulate hypothetical configurations for database system 200 using HCA engine 240. What-if index analysis UI 250 prompts the database administrator for input to define and analyze workloads and configurations for database system 200 and generates the appropriate commands supported by hypothetical configuration simulation interface 262 for execution by HCA engine 240.

For embodiments using the Microsoft® SQL Server as database server 220, the database administrator may use the SQL Server Profiler to generate a workload for database system 200 by logging events on database server 220 over a specified period of time into a workload file. The database administrator may also use a filter to log only relevant events. Alternatively, the database administrator may define a workload dynamically by specifying the set of queries for the workload using a highlighted buffer of queries presented to the database administrator by what-if index analysis UI 250.

Figure 4:
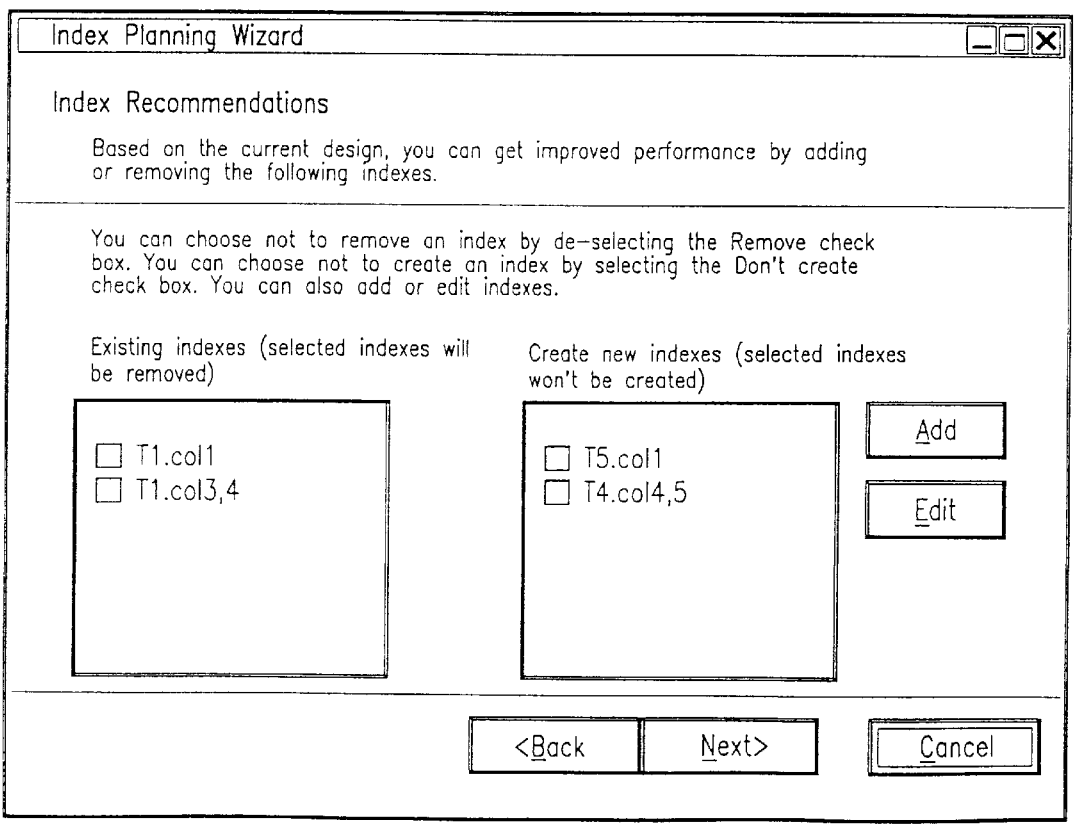
FIG. 4 illustrates an exemplary user interface for defining a hypothetical configuration for a database system.

To define a new configuration, what-if index analysis UI 250 prompts the database administrator to define the set of indexes and database size for the configuration. What-if index analysis UI 250 for one embodiment presents to the database administrator a screen with the list of indexes for the existing configuration and prompts the database administrator to add or remove indexes to define a new configuration. An example of one such screen is illustrated in FIG. 4 where a list of indexes is recommended by index selection tool 230 and the database administrator is prompted to change some or all of the indexes for the existing configuration. What-if index analysis UI 250 may also present the database administrator with the list of tables and associated row counts for the existing configuration and prompt the database administrator to either modify the row count or specify a row count multiplier for any table for a new configuration.

What-if index analysis UI 250 may present to the database administrator the evaluation of a workload with respect to a configuration in any suitable manner. What-if index analysis UI 250 may present a cost estimate of a workload with respect to a hypothetical configuration, for example, by displaying the cost estimate relative to the cost estimate of the workload with respect to the existing configuration. What-if index analysis UI 250 may also display, for example, the top 25 queries of the workload by cost. What-if index analysis UI 250 may present index usage for a workload with respect to a hypothetical configuration, for example, by displaying the fraction of queries of the workload that uses one or more indexes. What-if index analysis UI 250 may also display, for example, the top 10 indexes by usage.

Implementation of HCA Interface

HCA engine 240 interfaces with database server 220 using server interface 270 to evaluate a workload with respect to the existing or a hypothetical configuration. HCA engine 240 may interface with database server 220 in any suitable manner to simulate hypothetical configurations and to evaluate a workload with respect to the existing configuration or a simulated hypothetical configuration.

HCA engine 240 for one embodiment interfaces with database server 220 to evaluate queries of a workload with respect to the existing configuration by invoking query optimizer 224. Query optimizer 224 generates plans comprising cost estimates and index usage for the execution of queries using existing indexes in database server 220. In determining whether to use any particular one of the existing indexes in executing a query, query optimizer 224 uses statistical information on the column(s) of each existing index. Database server 220 may gather this statistical information in accordance with Table 3 for the columns of tables over which indexes are constructed during the index generation phase and may store this statistical information as existing index entries 227 in catalog table 226. This statistical information for one embodiment comprises a histogram on the column values on which the index is defined.

Because database server 220 may similarly gather statistical information for indexes that have not been constructed, the presence of such hypothetical or what-if indexes may be simulated for consideration by query optimizer 224 in evaluating queries with respect to a hypothetical configuration. Database server 220 for one embodiment does not need to write out pages of a what-if index because using query optimizer 224 to evaluate queries with respect to a hypothetical configuration requires only the statistical information for an index and does not require the actual use of the index by database server 220 to access any data in database 210. In gathering statistical information for a what-if index, database server 220 may sample a fraction or percentage of the pages of the table for the what-if index or may read all pages of the table to obtain possibly more accurate cost estimates by query optimizer 224 at the expense of increasing time and memory costs. Database server 220 may gather the statistical information for what-if indexes in accordance with Table 3 and may store this statistical information as what-if index entries 228 in catalog table 226.

For one embodiment, what-if index entries 228 are stored similarly as existing index entries 227 only what-if index entries 228 are marked with what-if index tags to distinguish what-if index entries 228 from existing index entries 227. Catalog table 226, existing index entries 227, and what-if index entries 228 may be implemented in the form of one or more suitable data structures and may be stored on any suitable computer-readable medium.

Figure 5:
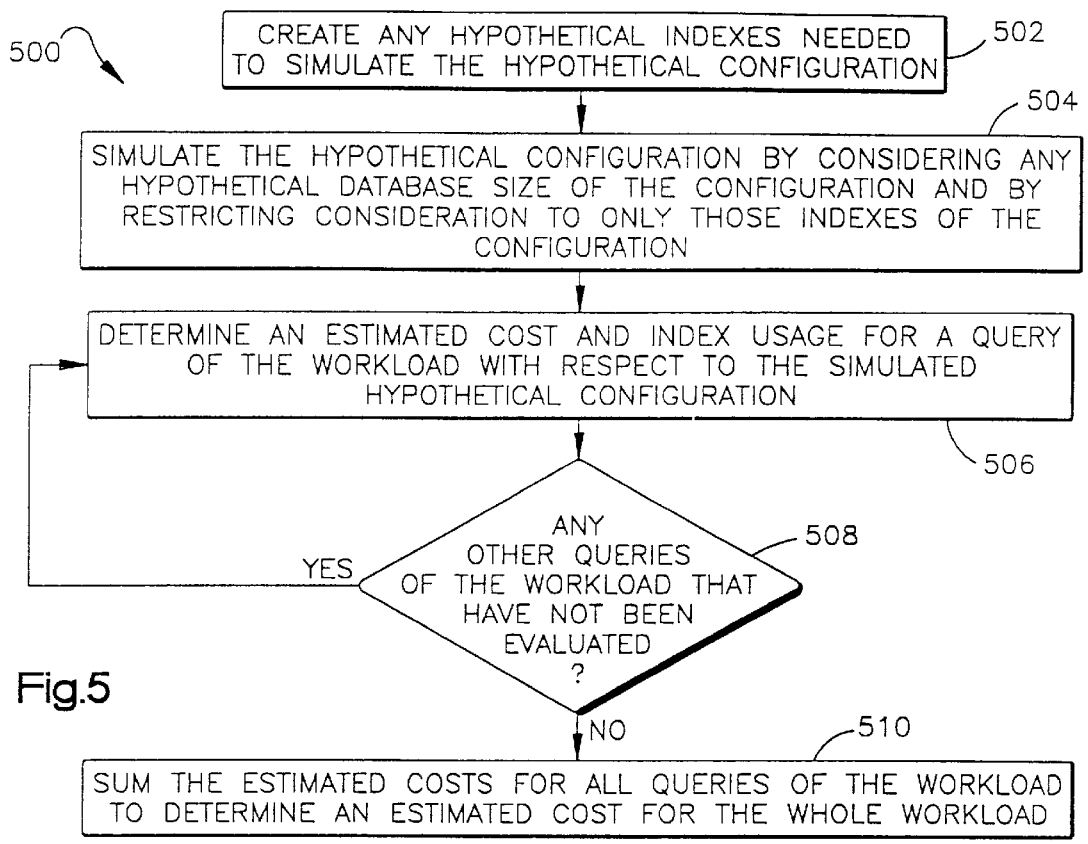
FIG. 5 illustrates, for one embodiment, a flow diagram for simulating a hypothetical configuration in a database system.

HCA engine 240 for one embodiment evaluates queries of a designated workload with respect to a designated hypothetical configuration in accordance with flow diagram 500 of FIG. 5. HCA engine 240 for one embodiment performs flow diagram 500 in response to the Estimate Configuration command designating a workload and a hypothetical configuration.

For step 502, HCA engine 240 invokes database server 220 to create any hypothetical or what-if indexes needed to simulate the designated hypothetical configuration. As illustrated in FIG. 3, HCA engine 240 for one embodiment issues to database server 220 a create index command 272 designating a table of database 210 and one or more columns of the table for each hypothetical index to be created.

Create index command 272 for one embodiment is in the form CREATE INDEX <index_name> ON <table_name (column_name(s))> WITH STATISTICS ONLY [=<fraction>] to designate that a hypothetical or what-if index named <index_name> is to be created by gathering statistical information on the column(s) named column_name(s) of the table named table_name using a sample of that table as designated by <fraction>. If <fraction> is not designated, database server 220 may use a suitable default fraction for sampling. As one example, the command CREATE INDEX supplier_stats ON Orders(supplier) WITH STATISTICS ONLY=0.10 would be used to create a hypothetical index named supplier_stats on the supplier column of the Orders table by sampling 10% of the rows in the Orders table.

Database server 220 may execute create index command 272 in any suitable manner to create a hypothetical or what-if index.

HCA engine 240 for one embodiment may invoke database server 220 to create what-if index entries 228 as described in U.S. patent application Ser. No. 08/912,036, U.S. patent application Ser. No. 08/980,830, U.S. patent application Ser. No. 08/982,046, U.S. patent application Ser. No. 08/980,831, and U.S. patent application Ser. No. 08/980, 829. Briefly, HCA engine 240 may designate a table of database 210 and one or more columns of that table for the what-if index to be created. Database server 220 may then sample the fraction or percentage of the pages of the designated table and sort the rows of the sampled pages by the designated one or more columns of the table to generate the statistical information for the what-if index.

Database server 220 for one embodiment uses an adaptive page-level sampling technique as described in U.S. patent application Ser. No. 09/139,835 (Attorney Docket No. 14-683) filed on the same date as this patent application, entitled HISTOGRAM CONSTRUCTION USING ADAPTIVE RANDOM SAMPLING WITH CROSS-VALIDATION FOR DATABASE SYSTEMS, by Surajit Chaudhuri, Rajeev Motwani, and Vivek Narasayya, to gather statistical information for the what-if index to be created. This patent application is herein incorporated by reference. Briefly, database server 220 obtains a seed sample of approximately m pages of the table for the what-if index. Database server 220 for one embodiment samples approximately $m=\sqrt{n}$ pages of the table where n is the number of pages in the table. Based on this sample, database server 220 generates a sorted list of column values and a set of statistical measures comprising an equi-depth histogram of the column values characterized by step boundaries. Database server 220 samples another approximately m pages of the table and tests how well the values of this new sample fit within the histogram. If this test for convergence fails, database server 220 merges the new sample with the sample (s) collected thus far and updates the sorted list of column values as well as the statistical measures. Database server 220 continues to collect and check new samples in this manner until the values of a new sample fit within the updated histogram within a predetermined degree of accuracy.

For step 504, HCA engine 240 invokes query optimizer 224 to simulate the hypothetical configuration. HCA engine 240 for one embodiment requests query optimizer 224 to restrict the consideration of indexes to those of the hypothetical configuration and to consider the table and index sizes in database 210 as adjusted by the database size of the hypothetical configuration.

As illustrated in FIG. 3, HCA engine 240 for one embodiment issues to database server 220 a define configuration command 274 to invoke query optimizer 224 with a connection-specific hypothetical configuration (HC) mode call having as arguments (1) the set of indexes of the hypothetical configuration and (2) the database size of the hypothetical configuration. By conveying the information for a hypothetical configuration in a connection-specific manner, database server 220 may concurrently execute operational queries against database 210 while optimizing queries with respect to the hypothetical configuration.

For embodiments using an SQL server for database server 220, HCA engine 240 also passes as a third argument the base index for each table of the hypothetical configuration because the leaf node of a non-clustered B+-tree index contains the keys of the clustered index, if any, on that table and because the plan chosen by query optimizer 224 depends on the columns available in each index. The base index for a table is either the clustered index on the table or, in the absence of a clustered index in the configuration, the heap structure for the table.

HCA engine 240 projects the size of each index of the hypothetical configuration based on the database size of the hypothetical configuration. For embodiments using an SQL server for database server 220, the size of a non-clustered index depends on the clustered index, if any, on that table. As one example, if a configuration comprises a clustered index on column A of a table and a non-clustered index on column B of that same table, the size of the index on column B is proportional to the sum of the widths of columns A and B. If a hypothetical configuration comprises clustered indexes $I_1$ and $I_2$ on the same table and a non-clustered index $I_3$ on that same table, HCA engine 240 would then consider one scaling value for the size of the index $I_3$ in simulating the configuration $\{I_1, I_3\}$ and a different scaling value for the size of the index $I_3$ in simulating the configuration $\{I_2, I_3\}$.

For step 506, HCA engine 240 invokes query optimizer 224 to produce a plan for execution of a query of the designated workload with respect to the simulated hypothetical configuration and return both the estimated cost to execute the query with respect to the hypothetical configuration and any indexes that are expected to be used to answer the query.

As illustrated in FIG. 3, HCA engine 240 for one embodiment issues to database server 220 an optimize query command 276 to invoke query optimizer 224 in this manner, and query optimizer 224 returns to HCA engine 240 an execution plan 278 comprising the cost estimate and the indexes expected to be used to answer the query. HCA engine 240 for one embodiment invokes query optimizer 224 in a no-execution mode so as to request the execution plan 278 from query optimizer 224 without actually executing that plan. For embodiments using the Microsoft® SQL Server as database server 220, query optimizer 224 returns the execution plan 278 through the Showplan interface.

For step 508, HCA engine 240 determines whether all queries of the workload have been evaluated and, if not, performs step 506 for another query of the workload. HCA engine 240 repeats steps 506–508 until all queries of the workload have been evaluated with respect to the simulated hypothetical configuration. HCA engine 240 for step 510 may then determine the estimated cost of the whole workload with respect to the hypothetical configuration as the sum of the cost estimates for all queries of the workload.

As one example where database system 200 has an existing configuration comprising a table T with indexes $I_1$ and $I_2$, where index $I_1$ is the clustered index for the table T, and where the table T has one million rows in the existing configuration, HCA engine 240 for one embodiment performs flow diagram 500 as follows to evaluate a workload W with respect to a hypothetical configuration having the hypothetical set of indexes $\{I_1, I_3\}$ and the size of table T as ten million rows.

For step 502, HCA engine 240 creates the hypothetical index $I_3$ because this index is absent from the existing configuration. HCA engine 240 for step 504 computes the new sizes $S_1$ and $S_3$ of the indexes $I_1$ and $I_3$, respectively, when the number of rows of the table T is scaled to ten million, talking into account that index $I_1$ is the clustered index. HCA engine 240 then invokes query optimizer 224 with a connection-specific hypothetical configuration (HC) mode call HC__mode(($I_1$, $I_3$) ($S_1$, $S_3$), (1, 0)) to simulate the hypothetical configuration, passing to query optimizer 224 the indexes $I_1$ and $I_3$ of the hypothetical configuration to be considered by query optimizer 224 for plan generation, the respective sizes $S_1$ and $S_3$ of each index $I_1$ and $I_3$, and an indication that index $I_1$ is the base index for the table T. For steps 506 and 508, HCA engine 240 invokes query optimizer 224 for each query of the workload W to obtain the cost estimate and index usage for each query with respect to the hypothetical configuration. HCA engine 240 for step 510 may then determine the estimated cost of the whole workload W with respect to the hypothetical configuration as the sum of the determined cost estimates for all queries of the workload W.

For other embodiments, HCA engine 240 may implement hypothetical configurations by physically altering the existing configuration at the expense of incurring additional overhead to create and remove indexes and of degrading the performance of database system 200 with respect to the execution of operational queries.

Maintaining Analysis Data Tables

The analysis data tables generated for the simulation of hypothetical configurations may be maintained by database system 200 in any suitable manner. Although presented as relations in non-first-normal form, the analysis data may be stored in multiple normalized tables. For one embodiment, the schema of the analysis data tables can be assumed to be fixed once the properties of entities supported by HCA engine 240, such as queries, indexes, etc., are determined.

Database server 220 may maintain each analysis data table as a system catalog for one embodiment. Any naming issues for the tables are then resolved for embodiments where the system catalog names are fixed a priori. When database server 220 is invoked to simulate a hypothetical configuration, database server 220 may write the resulting analysis data to the appropriate system catalog. As system catalogs, the analysis data tables may be accessed directly by a user using suitable queries, for example.

For another embodiment, HCA engine 240 may write the analysis data returned by database server 220 into connection-specific temporary tables. When an index analysis session using HCA engine 240 has been completed, the analysis data generated during the session may then be saved by HCA engine 240 using a suitable Save command. The analysis data may be saved, for example, at the option of a user into user specified tables. The user may name the saved tables and access the tables using suitable queries, for example.

Summary Analysis

HCA engine 240 may also be used to perform summary analyses using the ability of HCA engine 240 to simulate hypothetical configurations. HCA engine 240 may be used to perform summarizations of workloads, configurations, and the performance of workloads with respect to the existing configuration and hypothetical configurations.

Figure 6:
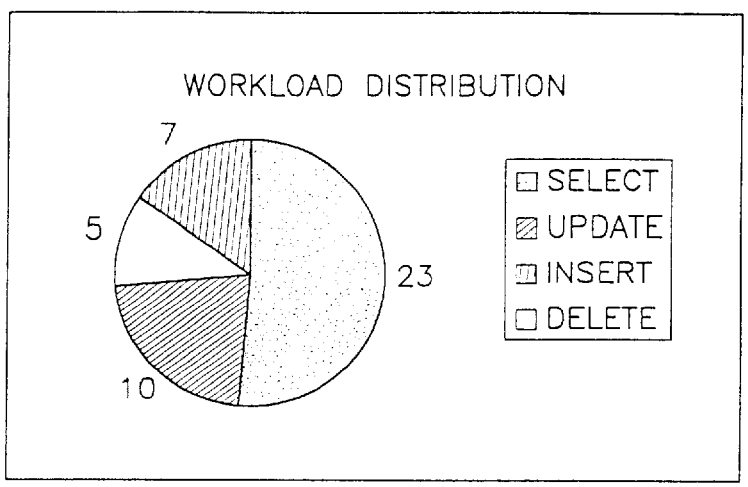
FIGS. 6, 7, and 8 illustrate exemplary user interfaces each produced by performing a summary analysis of a database system.
Figure 7:
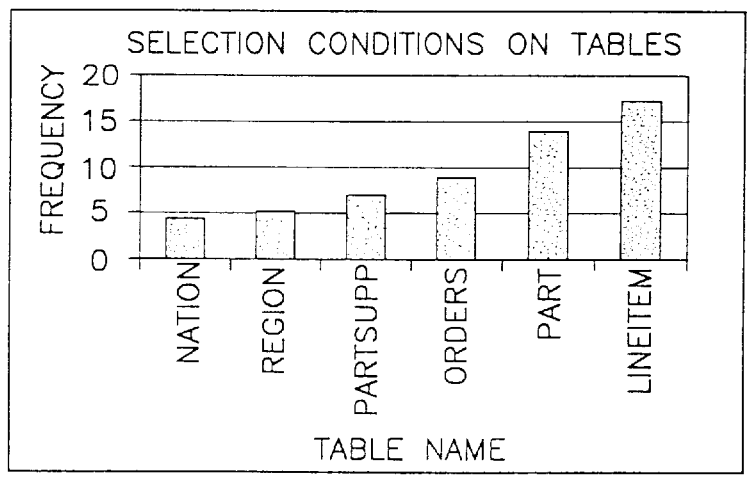
Figure 8:
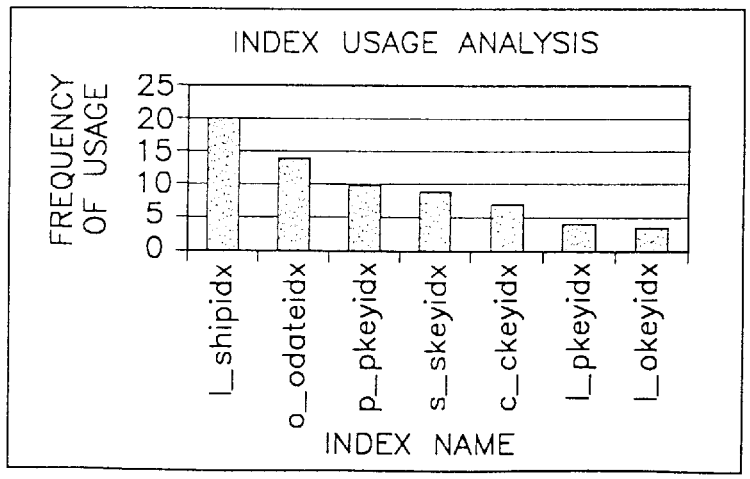

FIGS. 6, 7, and 8 illustrate exemplary user interfaces each produced by performing a summary analysis that may be useful to a database administrator. FIG. 6 illustrates a breakdown of a workload by the type of queries. FIG. 7 illustrates a breakdown of selection conditions in queries by table after drilling-down on the queries of type Select, for example, to provide the database administrator with a better grasp of a workload. FIG. 8 illustrates the relative frequencies of usage of indexes in the existing configuration, for example, to assist the database administrator in identifying indexes that are rarely used and that therefore may be removed.

HCA engine 240 for one embodiment may be used to perform workload analysis to analyze queries and their structural properties, to perform configuration analysis to analyze indexes and their structural properties, and to perform cost and index usage analysis to analyze relationship properties between one or more queries and a configuration.

HCA engine 240 performs a summary analysis over a set of one or more objects. For workload analysis, for example, the objects are queries. For configuration analysis, the objects are indexes. For cost and index usage analysis, the objects are relationship objects that capture the interaction between queries of a workload and a configuration. The set of objects for each of these analyses may be implicitly identified. For workload analysis, the queries of a workload may be identified by the name of the workload. For configuration analysis, the indexes of a configuration may be identified by the name of the configuration. For cost and index usage analysis, the queries and the configuration may be identified by a workload name and a configuration name.

Each object has associated properties with each property classified as having an atomic value or a list or set value. Boolean is a type of atomic value.

For workload analysis, exemplary query properties having an atomic value comprise the type of query (e.g., Insert, Delete, Update, or Select), whether the query has a group by clause (Boolean), whether the query has an order by clause (Boolean), and whether the query has nested subqueries (Boolean). Exemplary query properties having a list or set value comprise the set of tables referenced in the query, required columns from each table, columns on which selection conditions exist, columns on which join conditions exist, and equi-join conditions. HCA engine 240 may identify any other suitable query properties by collecting additional parsed query information.

As one example, properties of the query SELECT R.a, R.b, S.c FROM R, S WHERE R.a=S.c AND R.b=$v_1$ comprise Select as the query type, {R, S} as the set of required tables, {R.a, R.b, S.c} as the set of required columns, {R.b} as the set of columns on which selection conditions exist, and {(R.a=S.c)} as the set of equi-join conditions.

For configuration analysis, exemplary index properties having an atomic value comprise the table on which the index is built, the width or number of columns of the index, the storage space for the index, the time of creation of the index, and whether or not the index is clustered (Boolean). Exemplary index properties having a list or set value comprise the list of columns in the index in major to minor order, for example. HCA engine 240 may identify any other suitable index properties.

As one example, properties of a clustered index $I_1$ on columns ($C_1$, $C_2$) of table T comprise T as the table on which the index is built, two as the width of the index, TRUE as to whether the index is clustered, and {$C_1$, $C_2$} as the list of columns. The storage space and time of creation properties may also be determined.

For cost and index usage analysis, exemplary properties having an atomic value for a relationship object of a query and a configuration comprise the cost of the query with respect to the configuration. Exemplary properties having a list or set value for a relationship object of a query and a configuration comprise the list of indexes of the configuration expected to be used to answer the query. HCA engine 240 may identify any other suitable relationship object properties, for example, by collecting additional information about the query execution plan. The operators used in the plan, for example, may be identified.

The objects and properties form the fundamental primitives for summary analysis. To help pose queries against analysis data, one or more numerical measures may be derived from each property of an object for summary analysis. The specification of a measure comprises a property name and an expression that derives a numerical measure from the property value. For an atomic valued property, the value of the property itself, such as the storage space for an index for example, or a user defined function of that value may be used as the numerical measure. For a list or set valued property, the count of the number of elements in the list or set, such as the number of tables referenced in a query for example, may be used as the numerical measure.

The numerical measure for a list or set valued property may also be derived by applying an aggregate function, such as Sum or Average for example, on the element values in the list or set. As one example for a property of a set of objects, an aggregate function may be used on a numerical measure for each object of the set to derive a numerical measure for the set of objects. The expression f(p) denotes the numerical measure for a list or set valued property p, where f is an aggregation function such as Count, Min, Max, Sum, or Average for example.

Given a numerical measure m for each object of a set of objects, a corresponding aggregate measure f(m) over the set of objects may be derived by applying an aggregate function f on the numerical measure values for the objects of the set of objects. As one example, the average number of tables referenced per query in a workload may be derived.

Summary Analysis Interface

As illustrated in FIG. 3, HCA interface 260 comprises a summary analysis interface 264 to support the ability to perform summary analyses using HCA engine 240. Summary analysis interface 264 for one embodiment supports the following paradigm of steps, as illustrated in FIG. 9, for summary analysis of analysis data generated using hypothetical configuration simulation.

Figure 9:
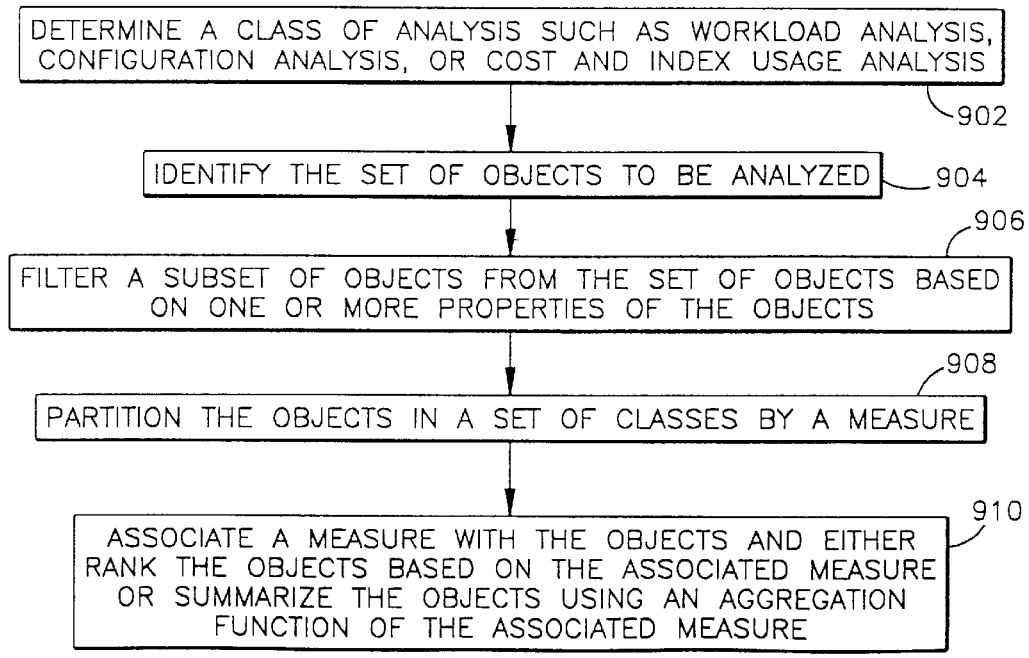
FIG. 9 illustrates, for one embodiment, a paradigm of steps for performing a summary analysis of a database system.

For step 902 of FIG. 9, a class of analysis is determined. The class of analysis may be, for example, workload analysis, configuration analysis, or cost and index usage analysis.

For step 904, the set of objects to be analyzed are identified. As one example, a workload name may be specified to identify queries for analysis.

For step 906, a subset of objects may optionally be filtered from the set of objects based on their properties, for example. As one example, queries that reference the table Orders may be filtered from a workload of queries. Successive filtering operations may also be supported. Using the same example, queries that reference the column Supplier in the table Orders may be filtered from the subset of queries that reference the table Orders. Successive filtering operations may be supported through drill-down using user interfaces, for example.

For step 908, the objects surviving any filtering may optionally be partitioned in a set of classes by a measure. The partitions need not be disjoint. Using the same example as for step 906, the queries that reference the table Orders may be partitioned by their query type.

For step 910, the set of objects surviving any filtering and/or partitioning are ranked or summarized. Objects may be ranked by associating a measure with each object, such as the number of tables referenced in a query for example, and using the measure to order the objects. The top k objects ranked by the measure may therefore be determined. Objects may also be summarized based on an aggregate measure, such as the average number of tables referenced by a set of queries. If the set of objects surviving any filtering are not partitioned, all such objects are ranked or summarized. Otherwise, the object(s) in each partition are separately ranked or summarized. For one embodiment, all partitions share the same ranking or summarization criteria.

Summary analysis interface 264 for one embodiment provides a generic querying model that supports the paradigm of FIG. 9 to formulate ad-hoc requests for summary analysis and also provides an extensible framework for generating new summary statistics from the analysis data tables. Summary analysis interface 264 supports, for example, the following query-like interface.

ANALYZE [WORKLOAD | CONFIGURATION | COST-USAGE]

WITH <parameter-list>

[TOP <number> | SUMMARIZE USING <aggregation-function>] BY <measure>

WHERE <filter-expression>

{PARTITION BY <partition-parameter> IN <number> STEPS}

Although described in the context of this particular command having a particular syntax, summary analysis interface 264 may use any suitable set of one or more commands to support the ability to perform summary analyses.

In executing the ANALYZE command, HCA engine 240 produces results in a format depending on whether the command specifies a ranking or summarization of analysis data.

In executing the ANALYZE command using SUMMARIZE, HCA engine 240 produces an output table having for each partition one row with two columns: one column for the value of the partitioning parameter and one column for the summarized value for that partition.

As one example, HCA engine 240 counts the number of queries of each query type in Workload_A in executing the following query Q1.

```
Q1:    ANALYZE WORKLOAD WITH Workload_A
       SUMMARIZE USING Count
       PARTITION BY Query_Type
```

In executing the ANALYZE command using SUMMARIZE without the PARTITION BY clause, HCA engine 240 produces a scalar output representing the summarized value for all objects analyzed for the query.

As one example, HCA engine 240 counts the total number of indexes of Current_Configuration in executing the following query Q2.

```
Q2:    ANALYZE CONFIGURATION WITH Current_Configuration
       SUMMARIZE USING Count
```

In executing the ANALYZE command using TOP, HCA engine 240 produces an output table having for each partition one row with three columns: one column for the value of the partitioning parameter, one column for the ranked object, and one column for the rank of that object within that partition. In executing the ANALYZE command using TOP without the PARTITION BY clause, HCA engine 240 produces <number> 2-column tuples.

As one example, HCA engine 240 returns the 20 most expensive queries in Workload_B with respect to Current_Configuration in executing the following query Q3.

```
Q3:    ANALYZE COST-USAGE WITH Workload_B,
       Current_Configuration
       TOP 20 BY Cost
```

The form for each tuple produced by HCA engine 240 for the query Q3 may be (Query, Rank).

Measures may be specified in the BY <measure> clause and the PARTITION BY <partition-parameter> clause. The <measure> specification may be omitted when the <aggregation-function> of the SUMMARIZE USING clause is Count.

As one example for a summary analysis based on an atomic valued property of an object, HCA engine 240 returns the top three indexes ranked by storage in New_Configuration in executing the following query Q4.

```
Q4:    ANALYZE CONFIGURATION WITH New_Configuration
       TOP 3 BY Storage
```

As an example for a summary analysis based on a list or set valued property of an object, HCA engine 240 counts in Workload_A the number of queries that reference a given number of tables in executing the following query Q5.

```
Q5:    ANALYZE WORKLOAD WITH Workload_A
       SUMMARIZE USING Count
       PARTITION BY Count(Tables)
```

The syntax of <filter-expression> for one embodiment is a Boolean expression where base predicates are composed using Boolean connectors.

For atomic valued properties, the base predicates have the form <property> <operator> <value>. The <operator> may be any comparison operator, such as >, <, =, or ≠ for example. For Boolean properties, only an equality check may be used for one embodiment. As one example, HCA engine 240 counts the number of two-column, non-clustered indexes in Current_Configuration in executing the following query Q6.

```
Q6:    ANALYZE CONFIGURATION WITH Current_Configuration
       SUMMARIZE USING Count
       WHERE (Num-Columns = 2) AND (Is-Clustered = FALSE)
```

For set valued properties, the base predicates may have the form <set property> [SUBSET-OF | SUPERSET-OF |=]<set>. As one example, HCA engine 240 returns the ten most expensive queries in Workload_A with respect to Current_Configuration such that the query references at least the tables part and supplier in executing the following query Q7.

```
Q7:    ANALYZE COST-USAGE WITH Workload_A,
       Current_Configuration
       TOP 10 BY Cost
       WHERE Tables SUPERSET-OF {part, supplier}
```

The base predicates for set valued properties may also have the form f (<set property>) <operator> <value>, where f is an aggregation function and <operator> is any comparison operator. As one example, the filter Count(Tables)>1 is satisfied for queries that reference at least two tables.

For list valued properties, the base predicates for set valued properties may be used by interpreting the list as a set. The base predicates for list valued properties may also be based on prefix matching in the form <list property> [SUBLIST-OF | SUPERLIST-OF |=]<list>. As one example, HCA engine 240 counts in Configuration_A the number of indexes that have part.size as the leading column, where Columns is the list property of an index that contains the columns in the index, in executing the following query Q8.

| | |
|---|---|
| Q8: | ANALYZE CONFIGURATION WITH Configuration_A<br>SUMMARIZE USING Count<br>WHERE Columns SUPERLIST-OF (part.size) |

The objects being analyzed may be partitioned either by a property that may or may not be numeric or by a numeric measure. The query Q1 is an example query that specifies a partition by a non-numeric property. The query Q5 is an example query that specifies a partition by a numeric measure. For a <partition-parameter> of the name of a list or set valued property, a separate partition is used for each distinct value d of the list or set. A set valued object S belongs to the partition for d if and only if d is a member of the set S. As one example, HCA engine 240 computes the average number of indexes used for queries on each table, but eliminating join queries, in executing the following query Q9.

| | |
|---|---|
| Q9: | ANALYZE COST-USAGE WITH Workload_A,<br>Current_Configuration<br>SUMMARIZE USING Average BY Count (Indexes-Used)<br>WHERE Count (Join-Columns) = 0<br>PARTITION BY Tables |

For the query Q9, a query of Workload_A belongs to the partition of each table that is referenced in that query. When the partitioning domain is numeric, the number of steps allows partitions to be coalesced into fewer steps.

The <parameter-list> depends on the class of analysis and may be a workload name for workload analysis, a configuration name for configuration analysis, or a combination of a workload name and a configuration name for cost and index usage analysis. Summary analysis interface 264 may also be extended to compare workloads and/or configurations by specifying multiple workloads and configurations for <parameter-list>.

As one example, HCA engine 240 compares the cost of queries of Workload_A that reference the table Orders with respect to Current_Configuration and Proposed_Configuration in executing the following query Q10.

| | |
|---|---|
| Q10: | ANALYZE COST-USAGE WITH Workload-A,<br>(Current_Configuration, Proposed_Configuration)<br>SUMMARIZE USING Sum BY Cost<br>WHERE Tables SUPERSET-OF Orders |

As another example, HCA engine 240 compares the cost of Configuration_A, Configuration_B, and Configuration_C corresponding to projected database sizes A, B, and C, respectively, in executing the following query Q11.

| | |
|---|---|
| Q11: | ANALYZE COST-USAGE WITH Workload_A,<br>(Configuration_A, Configuration_B, Configuration_C)<br>SUMMARIZE USING Sum BY Cost |

What-if index analysis UI 250 provides a user interface for a database administrator to perform summary analysis for database system 200 using HCA engine 240. What-if index analysis user interface UI 250 prompts the database administrator for input to specify the summary analysis to be performed for database system 200 and interfaces with HCA engine 240 using summary analysis interface 264 to perform the specified summary analysis. What-if index analysis UI 250 also presents summary analysis results to the database administrator, for example, by displaying the results in graph form to help the database administrator visualize the results. FIGS. 6, 7, 8, 10, 11, 12, 13, 14, and 15 illustrate exemplary user interfaces each produced by performing a summary analysis.

Figure 10:
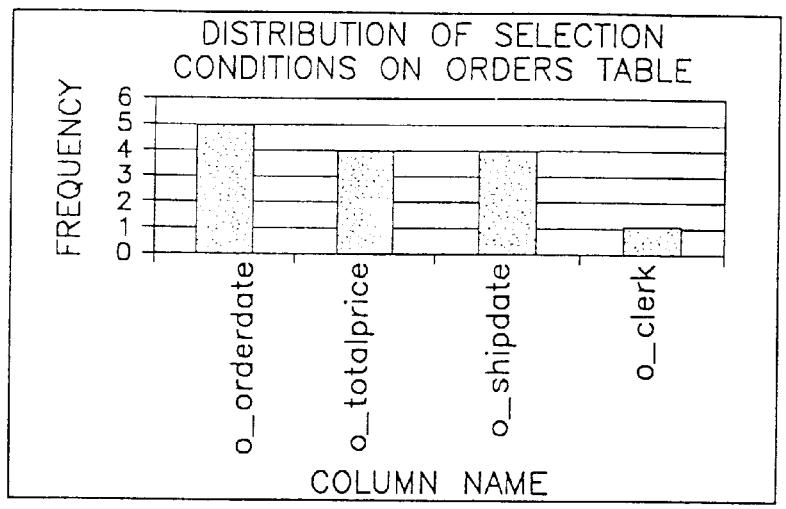
FIGS. 10, 11, 12, 13, 14, and 15 illustrate more exemplary user interfaces each produced by performing a summary analysis of a database system.

Exemplary workload analyses that may be performed using HCA engine 240 comprise counting the number of queries of a workload by type as illustrated in FIG. 6, drilling-down on the queries of the type Select of a workload and counting the number of selection conditions in those queries per table as illustrated in FIG. 7, listing the top five tables on which most queries of a workload are posted, comparing summary statistics from two workloads, and drilling-down at a table level to find which columns of a table have the most conditions posted on them as illustrated in FIG. 10.

Figure 11:
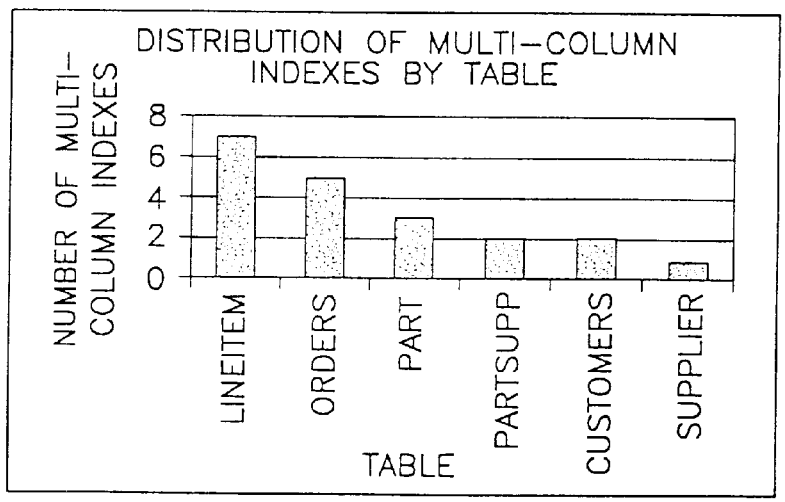
Figure 12:
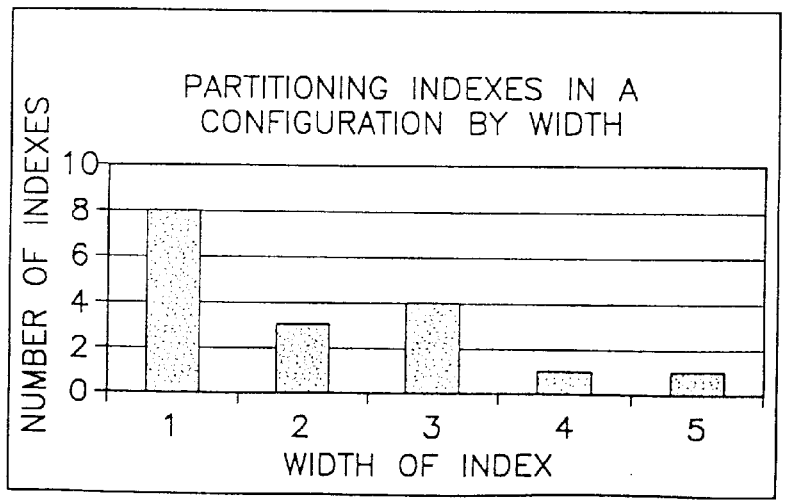

Exemplary configuration analyses that may be performed using HCA engine 240 comprise counting the number of indexes for each table, listing the top six tables ranked by the count of the multi-column indexes on those tables as illustrated in FIG. 11, and analyzing the distribution of indexes in a configuration by width as illustrated in FIG. 12.

Figure 13:
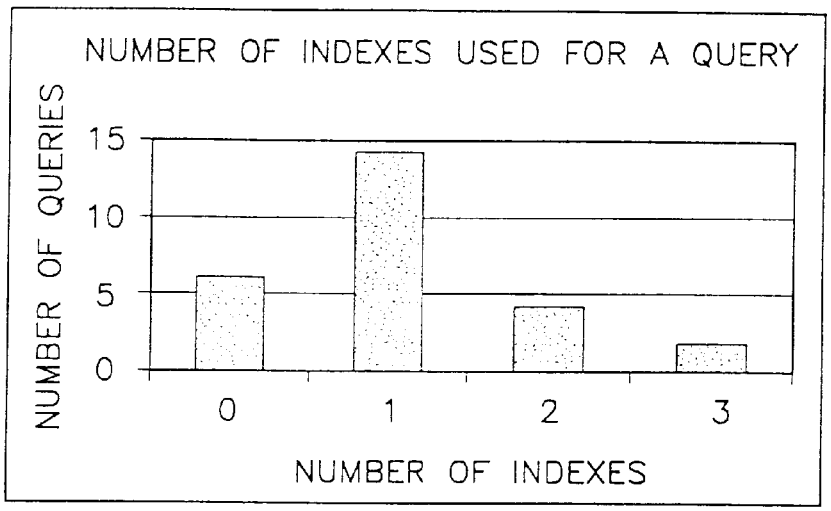
Figure 14:
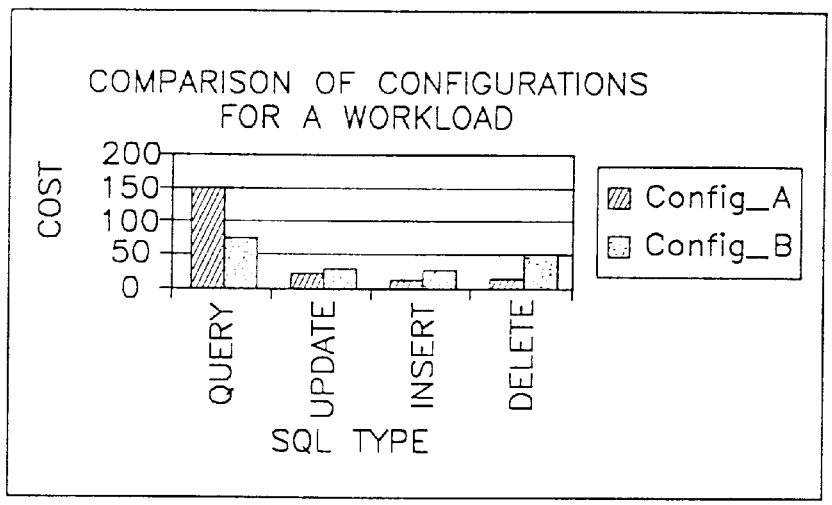
Figure 15:
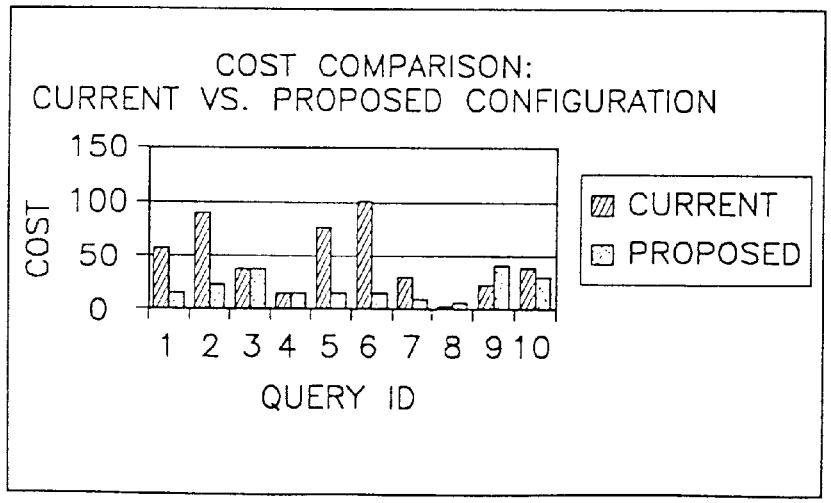

Exemplary cost and index usage analyses that may be performed using HCA engine 240 comprise analyzing the frequency of usage of each index of a configuration for a workload as illustrated in FIG. 8, counting the number of queries of a workload that used a given number of indexes with respect to a configuration as illustrated in FIG. 13, comparing the cost of two configurations for a workload by query type as illustrated in FIG. 14, and analyzing the cost of each query of a workload with respect to a proposed configuration relative to an existing configuration as illustrated in FIG. 15.

Summary Analysis Interface Implementation

HCA engine 240 for one embodiment maps the ANALYZE query into an equivalent query supported by database server 220, such as an SQL query for example, over the analysis data tables stored by database server 220. HCA engine 240 may further process the results of the query, such as by bucketizing the results for example, before completing the summary analysis. Because the ANALYZE query resembles SQL, HCA engine 240 may map the ANALYZE query into an SQL query with relative ease. HCA engine 240 may also exploit the ability to compose operations using table expressions in the FROM clause of an SQL query.

The class of analysis specified in the ANALYZE query determines the superset of analysis data tables that are to be joined to answer the query. For workload analysis, for example, HCA engine 240 accesses only workload analysis data tables. HCA engine 240 then generates a table expression $T_1$ that joins the required analysis data tables, only retrieving objects that are specified in the <parameter-list>. Any <filter-expression> specified in the query is included in the table expression $T_1$. HCA engine 240 then generates a table expression $T_2$ that partitions the table expression $T_1$ using any <partition-parameter>, using the GROUP BY construct, and the <aggregation-function> is applied to the attribute specified by <measure>. If instead, the query requests the TOP <number> of rows by <measure>, then the table expression $T_2$ is generated by applying an ORDER BY clause on the <measure> attribute of the table expression $T_1$. A cursor is opened for the table expression $T_2$ to return the first <number> of rows.

For other embodiments, summary analysis interface 264 may support a set of canned queries for performing predetermined summary analyses. Such canned queries, however, may not provide the extensible framework as the ANALYZE command. Summary analysis interface 264 may also directly interface with database server 220 using queries supported by database server 220, such as SQL queries for example, for direct access of the analysis data tables stored by database server 220. Using such queries, however, shifts the burden of analysis to a user or client tool of database server 220 and may require the manual generation of complex queries over the analysis data tables.

Exemplary What-If Index Analysis Session

Using what-if index analysis UI 250, a database administrator may use HCA engine 240 in a variety of manners to analyze the design of database system 200 and modify the design as desired.

The database administrator may begin by specifying a workload for the session. The workload may be a log of queries executed against database 210 over the past week. The database administrator asks for a breakdown of the queries by type to try to understand the workload mix. The results are displayed as illustrated in FIG. 6. The database administrator may then decide to focus on the most expensive queries in the workload for the existing configuration by requesting the top 25 queries ordered by cost. To decide which tables are good candidates for indexing, the database administrator may wish to see the distribution of conditions in queries on tables as illustrated in FIG. 7. Having picked a table that has many conditions on it, the database administrator may decide to further drill-down and look at the distribution of conditions in queries over columns of that table as illustrated in FIG. 10. This gives a good idea of which columns on the table are likely candidates for indexes. The database administrator finds that columns A and B of the table $T_2$ look promising.

The database administrator may then wish to see if indexes on columns A and B of the table $T_2$ already exist in the existing configuration. The database administrator does this by requesting to see all indexes on the table $T_2$ in the existing configuration ordered by their storage requirement. In this case, an index on column A exists but an index on column B does not exist. The database administrator then decides to explore hypothetical configuration scenarios that include an index on column B.

The database administrator decides to explore two what-if scenarios and evaluate each relative to the existing configuration. The database administrator first proposes a hypothetical configuration comprising the existing configuration with an additional non-clustered single-column index on column B of the table $T_2$. The database administrator compares the cost of the workload for this configuration with the cost of the workload for the existing configuration. Adding a single-column index on column B produces a 5% improvement in total cost of the workload as illustrated in FIG. 15. By studying index usage in the proposed configuration as illustrated in FIG. 8, the database administrator sees that the new index was used in three queries. Not being impressed with the improvement in performance, the database administrator decides to explore a different hypothetical configuration having a two-column index (B, A) on the table $T_2$ in addition to the existing configuration. Once again, the database administrator compares the cost of this configuration with the existing configuration and sees an 18% improvement for the workload. The database administrator then looks at the top five queries in the workload that are affected by adding the index and notices that two of the most expensive queries under the existing configuration were positively affected and that there were no queries that were negatively affected. The database administrator then decides to build the two-column index (B, A) and schedules the index to be built at midnight.

Although described in the context of serving as an impact analysis tool for index selection, the framework of HCA engine 240 may be extended to analyze other features of physical database design, such as materialized views for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. In a database system that executes queries over an existing configuration defined by an existing database and an existing set of indexes, a method for analyzing the database system comprising the steps of:

(a) defining a hypothetical configuration for the database system; and (b) generating design analysis data of the database system with respect to the hypothetical configuration.

2. The method of claim 1, wherein the defining step (a) comprises the step of defining a hypothetical set of indexes for the hypothetical configuration.

3. The method of claim 2, wherein the generating step (b) comprises the step of creating one or more hypothetical indexes for the hypothetical index set by sampling data of the existing database and generating statistical information for each hypothetical index based on the data sampling.

4. The method of claim 1, wherein the defining step (a) comprises the step of defining a hypothetical database size for the hypothetical configuration.

5. The method of claim 4, wherein the hypothetical database size defining step comprises the step of defining a scaling factor or a row count for one or more tables of the existing database.

6. The method of claim 1, wherein the generating step (b) comprises the step of simulating the hypothetical configuration for the database system.

7. The method of claim 1, wherein the generating step (b) comprises the step of estimating a cost of one or more queries with respect to the existing configuration and/or with respect to the hypothetical configuration.

8. The method of claim 7, wherein the cost estimating step comprises the step of estimating the cost of the one or more queries with respect to the hypothetical configuration relative to the cost of the one or more queries with respect to the existing configuration.

9. The method of claim 7, wherein the cost estimating step comprises the step of estimating the cost of one or more queries with respect to a configuration using a query optimizer of a database server.

10. The method of claim 1, wherein the generating step (b) comprises the step of identifying index usage of one or more queries with respect to the existing configuration or with respect to the hypothetical configuration.

11. The method of clam 10, wherein the index usage identifying step comprises the step of identifying the index usage of one or more queries with respect to a configuration using a query optimizer of a database server.

12. The method of claim 1, comprising the step of:
(c) summarizing one or more features of the database system based on the generated design analysis data.

13. The method of claim 12, wherein the summarizing step (c) comprises the step of summarizing a feature of a workload of one or more queries.

14. The method of claim 13, wherein the workload feature summarizing step comprises the step of summarizing the feature of the workload based on a measure of one or more properties of each query of the workload.

15. The method of claim 12, wherein the summarizing step (c) comprises the step of summarizing a feature of the existing configuration or the hypothetical configuration.

16. The method of claim 15, wherein the configuration feature summarizing step comprises the step of summarizing the feature of a configuration based on a measure of one or more properties of the configuration.

17. The method of claim 12, wherein the summarizing step (c) comprises the step of summarizing a feature of an estimated performance of one or more queries with respect to the existing configuration or with respect to the hypothetical configuration.

18. The method of claim 17, wherein the estimated performance feature summarizing step comprises the step of summarizing the feature of an estimated performance of one or more queries based on a measure of one or more properties of the estimated performance.

19. The method of claim 18, wherein the one or more properties of the estimated performance comprise a cost to execute a query with respect to a configuration.

20. The method of claim 18, wherein the one or more properties of the estimated performance comprise one or more indexes expected to be used in executing a query with respect to a configuration.

21. A computer readable medium having computer-executable instructions for analyzing a database system that executes queries over an existing configuration defined by an existing database and an existing set of indexes, the computer-executable instructions for performing steps comprising:
(a) defining a hypothetical configuration for the database system; and
(b) generating design analysis data of the database system with respect to the hypothetical configuration.

22. The computer readable medium of claim 21, wherein the generating step (b) comprises the step of simulating the hypothetical configuration for the database system.

23. The computer readable medium of claim 21, wherein the generating step (b) comprises the step of estimating a cost of one or more queries with respect to the existing configuration and/or with respect to the hypothetical configuration.

24. The computer readable medium of claim 21, wherein the generating step (b) comprises the step of identifying index usage of one or more queries with respect to the existing configuration or with respect to the hypothetical configuration.

25. The computer readable medium of claim 21 having further computer-executable instructions for performing the step of:
(c) summarizing one or more features of the database system based on the generated design analysis data.

26. The computer readable medium of claim 25, wherein the summarizing step (c) comprises the step of summarizing a feature of a workload of one or more queries.

27. The computer readable medium of claim 25, wherein the summarizing step (c) comprises the step of summarizing a feature of the existing configuration or the hypothetical configuration.

28. The computer readable medium of claim 25, wherein the summarizing step (c) comprises the step of summarizing a feature of an estimated performance of one or more queries with respect to the existing configuration or with respect to the hypothetical configuration.

29. A method for interfacing for a database system that executes queries over an existing configuration defined by an existing database and an existing set of indexes, the method comprising the step of:
issuing one or more commands to define a hypothetical configuration for the database system and generate design analysis data of the database system with respect to the hypothetical configuration.

30. The method of claim 29, wherein the issuing step comprises the step of issuing a command to define a hypothetical set of indexes for the hypothetical configuration.

31. The method of claim 29, wherein the issuing step comprises the step of issuing a command to define a hypothetical database size for the hypothetical configuration.

32. The method of claim 29, wherein the issuing step comprises the step of issuing a command to estimate a cost of one or more queries with respect to the existing configuration or with respect to the hypothetical configuration.

33. The method of claim 29, wherein the issuing step comprises the step of issuing a command to estimate index usage of one or more queries with respect to the existing configuration or with respect to the hypothetical configuration.

34. The method of claim 29, comprising the additional step of issuing one or more commands designating an analysis class and a set of one or more objects to obtain summary analysis data about the set of one or more objects based on the generated design analysis data and in accordance with the analysis class.

35. The method of claim 34, wherein the analysis class is a workload analysis and wherein each object of the set of one or more objects is a query.

36. The method of claim 34, wherein the analysis class is a configuration analysis and wherein the set of one or more objects comprises indexes of the existing configuration or indexes of the hypothetical configuration.

37. The method of claim 34, wherein the analysis class is a cost and index usage analysis and wherein the set of one or more objects comprises a relationship object for a workload and a configuration.

38. The method of claim 34, wherein the additional issuing step comprises the step of issuing a command designating a summarization measure with respect to a property of the set of one or more objects for the summary analysis data.

39. The method of claim 38, wherein the summarization measure is a count, sum, minimum, maximum, or average value of a property measure of the set of one or more objects.

40. The method of claim 34, wherein the additional issuing step comprises the step of issuing a command designating a rank with respect to a property measure of the set of one or more objects for the summary analysis data.

41. The method of claim 34, wherein the additional issuing step comprises the step of issuing a command designating a filter condition for the set of one or more objects to obtain summary analysis data about a subset of the set of one or more objects in accordance with the analysis class.

42. The method of claim 34, wherein the additional issuing step comprises the step of issuing a command designating a partitioning criteria for the set of one or more objects to obtain summary analysis data for each of a plurality of partitions of the set of one or more objects in accordance with the analysis class.

43. A computer readable medium having computer-executable instructions for interfacing for a database system that executes queries over an existing configuration defined by an existing database and an existing set of indexes, the computer-executable instructions for performing the step of:

issuing one or more commands to define a hypothetical configuration for the database system and generate design analysis data of the database system with respect to the hypothetical configuration.

44. The computer readable medium of claim 43, wherein the issuing step comprises the step of issuing a command to estimate a cost of one or more queries with respect to the existing configuration or with respect to the hypothetical configuration.

45. The computer readable medium of claim 43, wherein the issuing step comprises the step of issuing a command to estimate index usage of one or more queries with respect to the existing configuration or with respect to the hypothetical configuration.

46. The computer readable medium of claim 43 having further computer-executable instructions for performing the additional step of issuing one or more commands designating an analysis class and a set of one or more objects to obtain summary analysis data about the set of one or more objects based on the generated design analysis data and in accordance with the analysis class.

47. The computer readable medium of claim 46, wherein the analysis class is a workload analysis and wherein each object of the set of one or more objects is a query.

48. The computer readable medium of claim 46, wherein the analysis class is a configuration analysis and wherein the set of one or more objects comprises indexes of the existing configuration or indexes of the hypothetical configuration.

49. The computer readable medium of claim 46, wherein the analysis class is a cost and index usage analysis and wherein the set of one or more objects comprises a relationship object for a workload and a configuration.

50. A method for interfacing for a database system, the method comprising the step of:

issuing one or more commands designating an analysis class and a set of one or more objects to obtain summary analysis data about the set of one or more objects based on design analysis data of the database system and in accordance with the analysis class.

51. The method of claim 50, wherein the analysis class is a workload analysis and wherein each object of the set of one or more objects is a query.

52. The method of claim 50, wherein the analysis class is a configuration analysis and wherein the set of one or more objects comprises indexes of an existing or hypothetical configuration for the database system.

53. The method of claim 50, wherein the analysis class is a cost and index usage analysis and wherein the set of one or more objects comprises a relationship object for a workload and a configuration for the database system.

54. The method of claim 50, wherein the issuing step comprises the step of issuing a command designating a summarization measure with respect to a property of the set of one or more objects for the summary analysis data.

55. The method of claim 54, wherein the summarization measure is a count, sum, minimum, maximum, or average value of a property measure of the set of one or more objects.

56. The method of claim 50, wherein the issuing step comprises the step of issuing a command designating a rank with respect to a property measure of the set of one or more objects for the summary analysis data.

57. The method of claim 50, wherein the issuing step comprises the step of issuing a command designating a filter condition for the set of one or more objects to obtain summary analysis data about a subset of the set of one or more objects in accordance with the analysis class.

58. The method of claim 50, wherein the issuing step comprises the step of issuing a command designating a partitioning criteria for the set of one or more objects to obtain summary analysis data for each of a plurality of partitions of the set of one or more objects in accordance with the analysis class.

59. A computer readable medium having computer-executable instructions for interfacing for a database system, the computer-executable instructions for performing the step of:

issuing one or more commands designating an analysis class and a set of one or more objects to obtain summary analysis data about the set of one or more objects based on design analysis data of the database system and in accordance with the analysis class.

60. The computer readable medium of claim 59, wherein the analysis class is a workload analysis and wherein each object of the set of one or more objects is a query.

61. The computer readable medium of claim 59, wherein the analysis class is a configuration analysis and wherein the set of one or more objects comprises indexes of an existing or hypothetical configuration for the database system.

62. The computer readable medium of claim 59, wherein the analysis class is a cost and index usage analysis and wherein the set of one or more objects comprises a relationship object for a workload and a configuration for the database system.

* * * * *